United States Patent [19]

Henk

[11] Patent Number: 4,772,687

[45] Date of Patent: Sep. 20, 1988

[54] METAL COMPLEX DYESTUFFS USEFUL AS SOLVENT, DIRECT, PIGMENT OR FIBER-REACTIVE DYES

[75] Inventor: Hermann Henk, Cologne, Fed. Rep. of Germany

[73] Assignee: Bayer Aktiengesellschaft, Leverkusen, Fed. Rep. of Germany

[21] Appl. No.: 858,404

[22] Filed: May 1, 1986

[30] Foreign Application Priority Data

May 9, 1985 [DE] Fed. Rep. of Germany ....... 3516667

[51] Int. Cl.$^4$ .................... C09B 62/032; C09B 62/515; D06P 1/382; D06P 1/384

[52] U.S. Cl. .................................... 534/624; 534/582; 534/602; 534/617; 534/619; 534/622; 534/625; 534/700; 534/709; 534/710; 534/744; 534/756; 534/761; 534/762; 534/764; 534/632; 534/633; 534/637; 534/834; 534/837; 534/845

[58] Field of Search ............... 534/684, 627, 625, 633, 534/629, 700, 709, 624, 716, 534, 837, 761, 617, 762, 619, 710, 764

[56] References Cited

U.S. PATENT DOCUMENTS 4,024,123 5/1977 Dussy et al. ........................ 534/618

FOREIGN PATENT DOCUMENTS 33019 6/1965 German Democratic Rep. .................................... 534/684
230592 of 1911 Fed. Rep. of Germany ...... 534/684
2302716 8/1973 Fed. Rep. of Germany ...... 534/716
2533958 2/1977 Fed. Rep. of Germany ...... 534/684
434416 9/1935 United Kingdom ................ 534/684
1051219 12/1966 United Kingdom ................ 534/684
1511730 5/1978 United Kingdom ................ 534/618

OTHER PUBLICATIONS

Schetty, Index Chemicus, vol. 28, 90615 (1968).

*Primary Examiner*—Floyd D. Higel
*Attorney, Agent, or Firm*—Sprung Horn Kramer & Wood

[57] ABSTRACT

Metal complex dyestuffs which in the form of the free acid correspond to the formula (I)

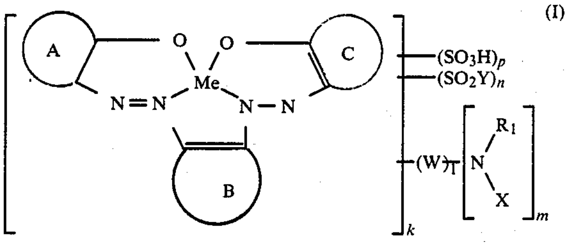

in which the substituents have the meaning given in the description are, depending on the meanings of the substituents, suitable for use as reactive dyestuffs for cotton, wool or polyamide, as direct dyestuffs for cotton or as pigment dyestuffs. Dyeings are obtained which have good fastness properties, in particular good wet-, light- and chlorine fastness.

9 Claims, No Drawings

METAL COMPLEX DYESTUFFS USEFUL AS SOLVENT, DIRECT, PIGMENT OR FIBER-REACTIVE DYES

The present invention relates to dyestuffs which in the form of the free acid conform to the formula

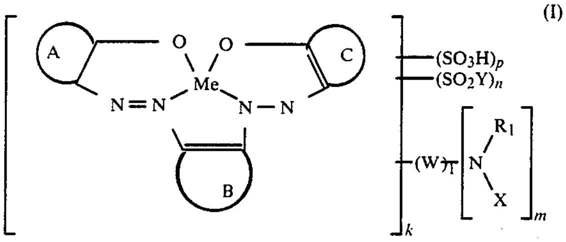
(I)

wherein

A = radical of benzene or naphthalene series

B = radical of benzene series which is substituted in p-position relative to the azo groups, C = radical of an enolic coupling component, in particular of an enolic coupling component of the hydroxybenzene, hydroxynaphthalene, pyrazolone, pyridone, pyrimidone, quinolone or acetoacetarylide series, W = direct bond or a bridge member to a C atom of benzene or naphthalene nuclei A, B or C or to a C atom of an aromatically heterocyclic ring C, $R_1$ = hydrogen or optionally substituted $C_1$–$C_4$-alkyl, X = fibre-reactive radical or H Y = vinyl, β-halogenovinyl or —O—$CH_2$—$CH_2$—Z wherein Z = leaving group k = 1 or 2 l = 0 or 1 p = 0 to 4 m = 0, 1, 2 or 3 n = 0, 1, 2, 3 or 4

Me = divalent metal atom, in particular Cu and Ni to a process for their preparation and to their use for dyeing and printing textile and non-textile materials.

Suitable leaving groups Z are for example —O—$SO_3H$, —S—$SO_3H$, —O—$PO_3H_2$, —$OCOCH_3$, dialkylamino and quaternary ammonium groups.

Fibre-reactive radicals X is to be understood as meaning those which have one or more reactive groups or detachable substituents which on application of the dye-stuffs to cellulose materials in the presence of acid-binding agents and where appropriate by means of heat are capable of reacting with the hydroxyl groups of the cellulose or on application to superpolyamide fibres, such as wool, are capable of reacting with the NH groups of this fibre to form covalent bonds. Such reactive groups are extensively described in the literature.

Possible substituents for optionally substituted $C_1$–$C_4$-alkyl are preferably: halogen, alkoxy ($C_1$–$C_4$), $SO_3H$, COOH, hydroxyl.

W preferably stands for a direct bond to a C atom of an aromatically carbocyclic or aromatically heterocyclic ring. Suitable bridge members W are for example —CO—, —$SO_2$—, —NH—CO—NH—,

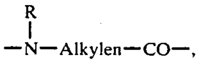, 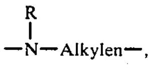,

-continued

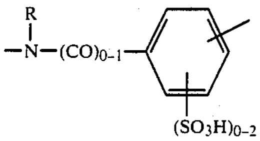 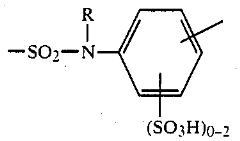

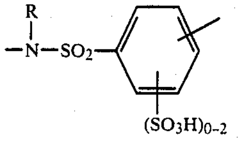 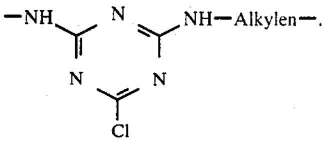

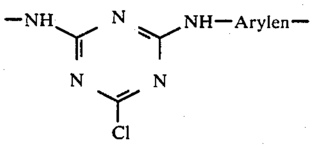 —Arylen—$(O)_{0-1}$—Alkylen.

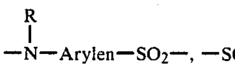, 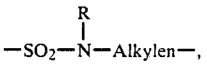,

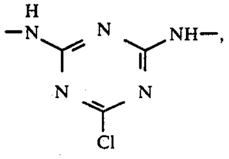, 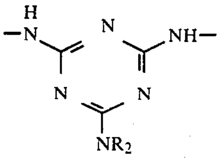

where

R preferably denotes H or $C_1$–$C_4$-alkyl alkylene preferably denotes $C_2$–$C_5$-alkylene and arylene preferably denotes optionally substituted phenyl.

Possible substituents for optionally substituted phenyl are preferably: alkyl ($C_1$–$C_4$), alkoxy ($C_1$–$C_4$), halogen, $SO_3H$, COOH, hydroxyl.

Reactive groups which are suitable according to the invention by containing at least one detachable substituent bonded to a heterocyclic or to an aliphatic radical are inter alia those which contain at least one reactive substituent bonded to a 5- or 6-membered heterocyclic ring, such as a monazine, diazine, triazine, for example pyridine, pyrimidine, pyridazine, parazine, thiazine, oxazine or asymmetrical or symmetrical triazine ring, or such a ring system as has one or more fused-on aromatic rings, such as quinoline, phthalazine, cinnoline, quinazoline, quinoxaline, acridine, phenazine and phenanthridine ring systems; the 5- or 6-membered heterocyclic rings which have at least one reactive substituent are accordingly preferably those which contain one or more nitrogen atoms and can contain 5- or preferably 6-membered fused-on carbocyclic rings.

The reactive substituents on the heterocycle are for example:

halogen (Cl, Br or F), ammonium, including hydrazinium, sulphonium, sulphonyl, azido (—$N_3$), thiocyanato, thio, thiolether, oxyether, sulphinic acid and sulphonic acid. Specific examples are as follows:

mono- or di-halogeno-symmetric-triazinyl radicals, for example 2,4-dichlorotriazin-6-yl, 2-amino-4-chlorotriazin-6-yl, 2-alkylamino-4-chlorotriazin-6-yl, such as 2-methylamino-4-chlorotriazin-6-yl or 2-ethylamino- or 2-propylamino-4-chlorotriazin-6-yl, 2-β-hydroxyethylamino-4-chlorotriazin-6-yl, 2-di-β-hydroxyethylamino-4-chlorotriazin-6-yl and the corresponding sulphuric acid half-esters, 2-diethylamino-4-chlorotriazin-6-yl, 2-morpholino- or 2-piperidino-4-chlorotriazin-6-yl, 2-cyclohexylamino-4-chlorotriazin-6-yl, 2-arylamino- and substituted arylamino-4-chlorotriazin-6-yl, such as 2-phenylamino-4-chlorotriazin-6-yl, 2-(o-, m- or p-carboxy- or -sulphophenyl)-amino-4-chlorotriazin-6-yl 2-alkoxy-4-chlorotriazin-6-yl, such as 2-methoxy- or -ethoxy-4-chlorotriazin-6-yl, 2-(phenyl-sulphonylmethoxy)-4-chlorotriazin-6-yl, 2-aryloxy- and substituted aryloxy-4-chlorotriazin-6-yl, such as 2-phenoxy-4-chlorotriazin-6-yl, 2-(p-sulphophenyl)-hydroxy-4-chlorotriazin-6-yl and 2-(o-, m- or p-methyl- or -methoxyphenyl)-hydroxy-4-chlorotriazin-6-yl, 2-alkylmercapto- or 2-arylmercapto- or 2-(substituted aryl)-mercapto-4-chlorotriazin-6-yl, such as 2-β-hydroxyethylmercapto-4-chlorotriazin-6-yl, 2-phenylmercapto-4-chlorotriazin-6-yl, 2-(4'-methylphenyl)-mercapto-4-chlorotriazin-6-yl and 2-(2',4'-dinitro)-phenyl-mercapto-4-chlorotriazin-6-yl, 2-methyl-4-chlorotriazin-6-yl, 2-phenyl-4-chlorotriazin-6-yl, 2,4-difluorotriazin-6-yl, monofluorotriazinyl radicals which are substituted by amino, alkylamino, aralkylamino or acylamino groups, alkyl denoting, in particular, optionally substituted $C_1$–$C_4$-alkyl, aralkyl denoting, in particular, optionally substituted phenyl-, $>C_1$–$C_4$-alkyl and aryl denoting, in particular, phenyl or naphthyl which is optionally substituted by sulpho, alkyl, in particular $C_1$–$C_4$-alkyl, alkoxy, in particular $C_1$–$C_4$-alkoxy, carboxylic acid or acylamino groups and halogen atoms, such as fluorine, chlorine or bromine, for example 2-amino-4-fluorotriazin-6-yl, 2-methylamino-4-fluorotriazin-6-yl, 2-ethylamino-4-fluorotriazin-6-yl, 2-isopropylamino-4-fluorotriazin-6-yl, 2-dimethylamino-4-fluorotriazin-6-yl, 2-diethylamino-4-fluorotriazin-6-yl, 2-β-methoxy-ethylamino-4-fluorotriazin-6-yl, 2-β-hydroxyethylamino-4-fluorotriazin-6-yl, 2-di-(β-hydroxyethylamino)-4-fluorotriazin-6-yl, 2-β-sulphoethylamino-4-fluorotriazin-6-yl, 2-β-sulphoethyl-methylamino-4-fluorotriazin-6-yl, 2-carboxymethylamino-4-fluorotriazin-6-yl, 2-β-cyanoethylamino-4-fluorotriazin-6-yl, 2-benzylamino-4-fluorotriazin-6-yl, 2-β-phenylethylamino-4-fluorotriazin-6-yl, 2-benzyl-methylamino-4-fluorotriazin-6-yl, 2-(x-sulphobenzyl)-amino-4-fluorotriazin-6-yl, 2-cyclohexylamino-4-fluorotriazin-6-yl, 2-(o-, m- or p-methylphenyl)-amino-4-fluorotriazin-6-yl, 2-(o-, m- or p-sulphophenyl)-amino-4-fluorotriazin-6-yl, 2-(2',5'-disulphophenyl)-amino-4-fluorotriazin-6-yl, 2-(o-, m- or p-chlorophenyl)-amino-4-fluorotriazin-6-yl, 2-(o-, m- or p-methoxyphenyl)-4-fluorotriazin-6-yl, 2-(2'-methyl-4'-sulphophenyl)-amino-4-fluorotriazin-6-yl, 2-(2'-methyl-5'-sulphophenyl)-amino-4-fluorotriazin-6-yl, 2-(2'-chloro-4'-sulphophenyl)-amino-4-fluorotriazin-6-yl, 2-(2'-chloro-5'-sulphophenyl)-amino-4-fluorotriazin-6-yl, 2-(2'-methoxy-4'-sulphophenyl)-amino-4-fluorotriazin-6-yl, 2-(O-, m- or p-carboxyphenyl)-amino-4-fluorotriazin-6-yl, 2-(2',4'-disulphophenyl)-amino-4-fluorotriazin-6-yl, 2-(3',5'-disulphophenyl)-amino-4-fluorotriazin-6-yl, 2-(2'-carboxy-4'-sulphophenyl)-amino-4-fluorotriazin-6-yl, 2-(6'-sulphonaphth-2'-yl)-amino-4-fluorotriazin-6-yl, 2-(4',8'-disulphonaphth-2'-yl)-amino-4-fluorotriazin-6-yl, 2-(6',8'disulphonaphth-2'-yl)-amino-4-fluorotriazin-6-yl, 2-(N-methylphenyl)-amino-4-fluorotriazin-6-yl, 2-(N-ethylphenyl)-amino-4-fluorotriazin-6-yl, 2-(N-β-hydroxyethylphenyl)-amino-4-fluorotriazin-6-yl, 2-(N-isopropylphenyl)-amino-4-fluorotriazin-6-yl, 2-morpholino-4-fluorotriazin-6-yl, 2-piperidino-4-fluorotriazin-6-yl, 2-(4',6',8'-trisulphonaphth-2'-yl)-4-fluorotriazin-6-yl, 2-(3',6',8'-trisulphonaphth-2'-yl)-4- fluorotriazin-6-yl, 2-(3',6'-disulphonaphth-1'-yl)-4-fluorotriazin-6-yl, mono-, di- or tri-halogenopyrimidinyl radicals, such as 2,4-dichloropyrimidin-6-yl, 2,4,5-trichloropyrimidin-6-yl, 2,4-dichloro-5-nitro-, -5-methyl-, -5-carboxymethyl-, -5-carboxy-, -5-cyano-, -5-vinyl-, -5-sulpho-, -5-mono-, -di- or -tri-chloromethyl- or -5-carboalkoxy-pyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4',5'-dichloro-6'-pyridazon-1'-yl)-phenylsulphonyl or -carbonyl, β-(4',5'-dichloro-6'-pyridazon-1'-yl)-ethylcarbonyl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotriazin-6-yl)-aminoacetyl, N-methyl-N-(2,3-dichloroquinoxaline-6-sulphonyl)-aminoacetyl, N-methyl-N-(2,3-dichloroquinoxaline-6-carbonyl)-aminoacetyl and the corresponding bromine and fluorine derivatives of the abovementioned chlorine-substituted heterocyclic radicals, and of these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methyl-sulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl and 2,6-difluoro-5-trifluoromethyl-4-pyrimidinyl; triazine radicals containing sulphonyl groups, such as 2,4-bis-(phenylsulphonyl)-triazin-6-yl, 2-(3'-carboxyphenyl)-sulphonyl-4-chlorotriazin-6-yl, 2-(3'-sulphophenyl)-sulphonyl-4-chlorotriazin-6-yl and 2,4-bis-(3'-carboxyphenylsulphonyl)-triazin-6-yl; pyrimidine rings containing sulphonyl groups, such as 2-carboxymethylsulphonyl-pyrimidin-4-yl, 2-methylsulphonyl-6-methyl-pyrimidin-4-yl, 2-methylsulphonyl-6-ethyl-pyrimidin-4-yl, 2-phenylsulphonyl-5-chloro-6-methyl-pyrimidin-4-yl, 2,6- bis-methylsulphonyl-pyrimidin-4-yl, 2,6-bis-methylsulphonyl-5-chloro-pyrimidin-4-yl, 2,4-bis-methylsulphonyl-pyrimidin-5-sulphonyl, 2-methylsulphonyl-pyrimidin-4-yl, 2-phenylsulphonyl-pyrimidin-4-yl, 2-trichloromethylsulphonyl-6-methyl-pyrimidin-4-yl, 2-methylsulphonyl-5-chloro-6-methyl-pyrimidin-4-yl, 2-methylsulphonyl-5-bromo-6-methyl-pyrimidin-4-yl, 2-methylsulphonyl-5-chloro-6-ethyl-pyrimidin-4-yl, 2-methylsulphonyl-5-chloro-6-chloromethyl-pyrimidin-4-yl, 2-methylsulphonyl-4-chloro-6-methyl-pyrimidine-5-sulphonyl, 2-methylsulphonyl-5-nitro-6-methyl-pyrimidin-4-yl, 2,5,6-trismethylsulphonyl-pyrimidin-4-yl, 2-methylsulphonyl-5,6-dimethyl-pyrimidin-4-yl, 2-ethylsulphonyl-5-chloro-6-methyl-pyrimidin-4-yl, 2-methylsulphonyl-6-chloro-pyrimidin-4-yl, 2,6-bis-methylsulphonyl-5-chloro-pyrimidin-4-yl, 2-methylsulphonyl-6-carboxy-pyrimidin-4-yl, 2-methylsulphonyl-5-sulpho-pyrimidin-4-yl, 2-methylsulphonyl-6-carbomethoxy-pyrimidin-4-yl, 2-methylsulphonyl-5-carboxypyrimidin-4-yl, 2-methylsulphonyl-5-cyano-6-methoxypyrimidin-4-yl, 2-methylsulphonyl-5-chloro-pyrimidin-4-yl, 2-sulphoethylsulphonyl-6-methyl-pyrimidin-4-yl, 2-methylsulphonyl-5-bromo-pyrimidin-4-yl, 2-phenylsulphonyl-5-chloro-pyrimidin-4-yl, 2-carboxymethylsulphonyl-5-chloro-6-methyl-pyrimidin-4-yl, 2-methylsulphonyl-6-chloropyrimidine-4- and -5-carbonyl, 2,6-bis-(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl and 2-methylsulphonyl-4-chloro-6-methylpyrimidine-5-sulphonyl or -carbonyl; triazine rings containing ammonium groups, such as 2-trimethylammonium-4-phenyl-amino- or -4-(o-, m- or p-sulphophenyl)-amino-triazin-6-yl, 2-(1,1-dimethylhydrazinium)-4-phenyl-amino- or -4-(o-, m- or p-sulphophenyl)-amino-triazin-6-yl, 2-(2-isopropylidene-1,1-dimethyl)-hydrazinium-4-phenyl-amino- or -4-(o-, m- or p-sulphophenyl)-amino-triazin-6-yl, and 2-N-aminopyrrolidinium- or 2-N-aminopiperidinium-4-phenyl-amino- or -4-(o-, m- or p-sulphophenyl)-amino-triazin-6-yl, and furthermore 4-phenylamino- or 4-(sulphophenylamino)-triazin-6-yl radicals which contain 1,4-bisazabicyclo[2.2.2]octane or 1,2-bis-aza-bicyclo[0.3.3]octane bonded in quaternary form in the 2-position via a nitrogen bond, and 2pyridinium-4-phenyl-amino- or -4-(o-, m- or p-sulphophenyl)-amino-triazin-6-yl and the corresponding 2-onium-triazin-6-yl radicals which are substituted in the 4-position by alkylamino, such as methylamino, ethylamino or β-hydroxyethylamino, alkoxy, such as methoxy or ethoxy, aryloxy, such as phenoxy, or sulphophenoxy groups; 2-chlorobenzothiazole-5- or -6-carbonyl or -5- or -6-sulphonyl, 2-arylsulphonyl- or -alkylsulphonyl-benzothiazole-5- or -6-carbonyl or -5- or -6-sulphonyl, such as 2-methylsulphonyl- or 2-ethylsulphonyl-benzothiazole-5- or -6-sulphonyl or -carbonyl, 2-phenylsulphonylbenzothiazole-5- or -6-sulphonyl or -carbonyl and the corresponding 2-sulphonylbenzothiazole-5- or -6-carbonyl or -sulphonyl derivatives containing Sulpho groups in the fused-on benzene ring, 2-chlorobenzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methylthiazole-(1,3)-5-carbonyl or -4- or -5-sulphonyl, and the N-oxide of 4-chloro- or 4-nitro-quinoline-5-carbonyl.

Reactive groups of the aliphatic series may furthermore be mentioned, such as acryloyl, mono-, di- or tri-chloroacryloyl, such as $-CO-CH=CH-Cl$, $-CO-CCl=CH_2$ and $-CO-CCl=CH-CH_3$, and furthermore $-CO-CCl=CH-COOH$, $-CO-CH=CCl-COOH$, β-chloropropionyl, 3-phenylsulphonylpropionyl, 3-methylsulphonylpropionyl, β-sulphato-ethylaminosulphonyl, vinylsulphonyl, β-chloroethylsulphonyl, β-sulphatoethylsulphonyl, β-methylsulphonylethylsulphonyl, β-phenylsulphonylethylsulphonyl, 2-fluoro-2-chloro-3,3-difluorocyclobutane-1-carbonyl, 2,2,3,3-tetrafluorocyclobutane-1-carbonyl or -1-sulphonyl, -(2,2,3,3-tetrafluoro-1-cyclobutyl)-acryloyl and α- or β-bromoacryloyl, or α- or β-alkyl- or -aryl-sulphonylacryloyl groups, such as α- or β-methylsulphonylacryloyl.

Preference is given to dyestuffs of the general formula

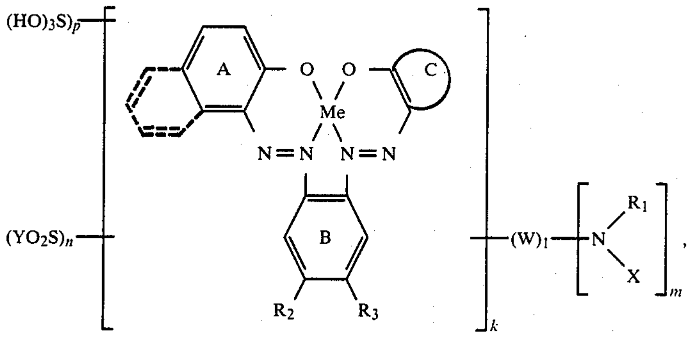

(II)

wherein

A and C may have further substituents, $R_2=C_1-C_4$-alkyl, halogen, in particular chlorine, $C_1-C_4$-alkoxy, $C_1-C_4$-alkylcarbonylamino, arylcarbonylamino, aralkylcarbonylamino, $R_3=C_1-C_4$-alkoxy, or $R_2$ and $R_3$ form a ring and have the meaning below:

$$R_2 + R_3 = NH-CO-CH_2-O, O-CH_2-CH_2-O$$

and Y, C, W, $R_1$, X, k, l, m, n, p and Me have the abovementioned meaning and the alkyl, alkoxy, aryl and aralkyl radicals can have customary substituents.

Preference is further given to dyestuffs of the general formula II which are free of water-solubilizing groups and wherein l, m, n, p=0 k=1, which are suitable in particular for use as pigments.

Preference is also given to dyestuffs of the general formula II wherein l, m, n=0 k=1 p=1-3 and which find utility in particular as wool, nylon and leather dyestuffs (in the form of the alkali metal salts) or as pigments (in the form of the alkaline earth metal salts) or as solvent dyestuffs (in the form of the amine salts).

Preference is also given to dyestuffs of the general formula II wherein l, m, p=0 k=1 n=1 or 2, wherein $Y=CH_2—CH_2Z$ $Z=—O—SO_3H$, $—S—SO_3H$, $—O—PO_3H_2$ which are suitable for use as reactive dyestuffs for wool, nylon and cotton.

Preference is also given to dyestuffs of the general formula II wherein m, n=0 l=1 k=2 and p=2 to 4 which are suitable for use as direct dyestuffs.

Particular preference is given to reactive dyestuffs of the general formula (III)

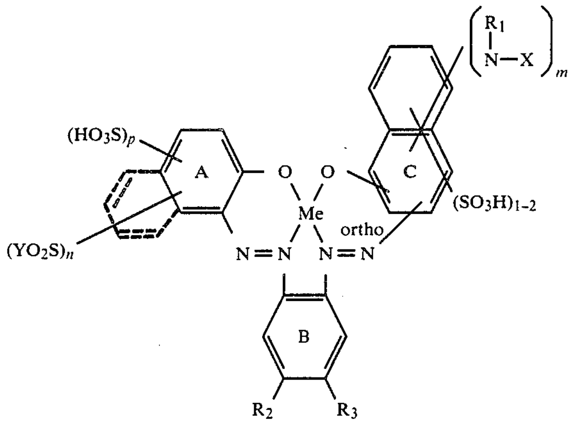

wherein

Y, n, $R_2$, $R_3$, $R_1$, X, m, p and Me have the above-mentioned meaning.

Particular preference is further given to reactive dyestuffs of the general formula III wherein $R_2$ and $R_3$=$C_1$-$C_4$-alkoxy $R_1$=H and Y, n, X, m, Me have the abovementioned meaning.

Particular preference is given to reactive dyestuffs of the formula (IV)

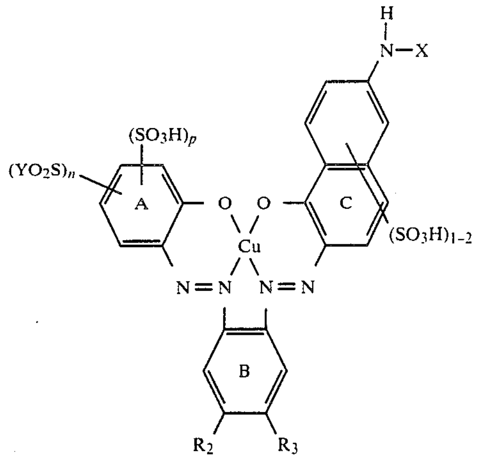

wherein $R_2$, $R_3$, X, Y, n and p have the abovementioned meaning. $R_2$ and $R_3$ preferably stand very generally for $OCH_3$.

The alkyl, alkoxy, aralkyl and aryl groups can have customary substituents.

The dyestuffs of the general formula I can be prepared in different ways. Either (a) ortho-hydroxyamino derivatives of the general formula (V)

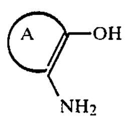

or (b) orthohalogenoamino derivatives of the general formula (VI)

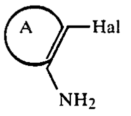

or (c) ortho-alkoxy-amino derivatives or ortho-alkyl- or aryl-sulphonyloxy-amino derivatives of the general formula (VII)

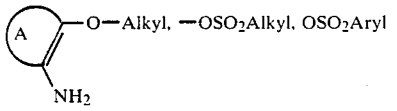

are diazotized and coupled on to a 3,4-disubstituted aniline derivative of the general formula

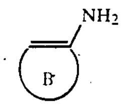
(VIII)

in conventional manner, for example in an aqueous medium, in ortho-position relative to the amino group to give an O-aminoazo dyestuff of the general formula IX

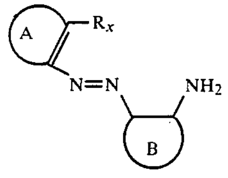

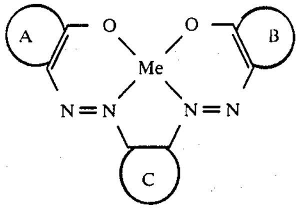
(XII)

is effected in the case of (XIa) by addition of metal-donating agents in the case of (XIb) by dehalogenation using metal-donating agents at elevated temperature and in the case of (XIc) by dealkylation or hydrolysis with metal-donating agents at elevated temperature.

The preparation of reactive dyestuffs is effected either by reacting amino-containing dyestuffs of the general formula

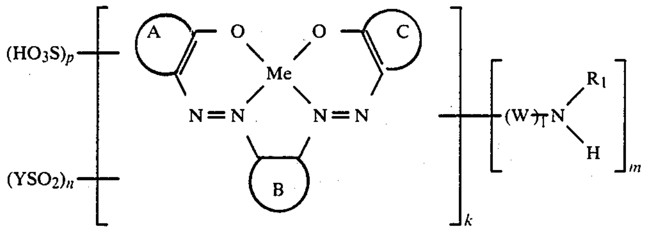
(XIII)

IX (a): $R_x$ = OH
IX (b): $R_x$ = halogen
IX (c): $R_x$ = O—alkyl, O—$SO_2$—alkyl, O—$SO_2$—aryl This dyestuff is further diazotized in conventional manner and coupled on to an "enol" of the general formula (X)

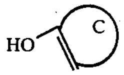

to give an ortho-diazo dyestuff of the general formula XI

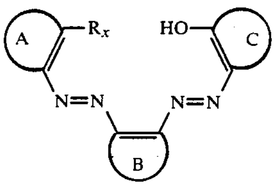

(a): $R_x$ = OH
(b): $R_x$ = halogen
(c): $R_x$ = O—alkyl, O—$SO_2$—alkyl, O—$SO_2$—aryl The metallization to give chromophores of the general formula with compounds of the X-halogen type to give dyestuffs of the general formula I and/or by introducing the leaving group Z into the general formula I wherein $Y=CH_2—CH_2—Z$,
n=1 and
m=0 or 1.

Suitable compounds of the general formula V are for example 2-aminophenol and all halogen-, nitro-, alkyl-, alkoxy-, carboxyl-, sulpho-, β-hydroxyethylsulphonyl- and acylamino-substituted 2-aminophenols, ortho-aminonaphthols and their sulphonic acids.

Suitable compounds of the general formula VI are for example 2-halogenoanilines and all halogen-, nitro-, alkyl-, alkoxy-, carboxyl-, sulpho-, β-hydroxyethylsulphonyl and acylamino-substituted 2-halogenoanilines, ortho-halogenonaphthylamines and their sulphonic acids.

Suitable compounds of the general formula VII are for example 2-alkOxyanilines, 2-alkylsulphonyloxyanilines, 2-arylsulphonyloxyanilines and all halogen-, nitro-, alkyl-, alkoxy-, carboxyl-, sulpho-, β-hydroxyethylsulphonyl and acylamino-substituted 2-alkoxyanilines, 2-alkylsulphonyloxyaniline, 2-arylsulphonyloxyanilines, ortho-alkoxynaphthylamines and their sulphonic acids.

Suitable compounds of the general formula VIII are for example 3-methoxy-4-methylaniline, 3-methoxy-4-chloro- or -bromo-aniline, 3,4-dimethoxyaniline, 3,4-diethoxyaniline, 3,4-diisopropoxyaniline, 3-methoxy-4-acetylaminoaniline, 3-methoxy-4-oxalylaminoaniline, 3-methoxy-4-benzoylaminoaniline and also

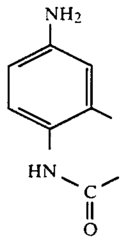

and

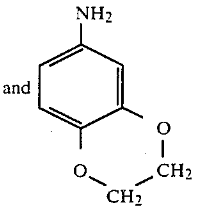

Suitable compounds of the general formula X are for example para-substituted phenols which couple in ortho-position relative to the OH group, 1H-, alkyl-, carbamoyl- or aryl-3-methyl- or carboxy-pyrazolones (5) and all halogen-, nitro-, amino-, alkyl-, alkoxy-, carboxyl-, sulpho- , β-hydroxyethylsulphonyl- and acylamino-substituted 1-phenyl-3-methyl- or 3-carboxy-pyrazolones (5), 1,4-dialkyl-2-hydroxypyridones (6) and all 1,4-dialkyl-2-hydroxypyridones (6) substituted in the 3-position by —CN, $—CONH_2$, $—CH_2—SO_3H$, $—SO_3H$, citrazinic acid, barbituric acid, acetoacetarylides and all alkyl-, alkoxy-, halogen-, carboxyl-, sulpho- , β-hydroxyethylsulphonyl- and acylamino-substituted acetoacetarylides, naphthols and their mono-, di- and tri-sulphonic acids, aminonaphthols and their mono- and di-sulphonic acids, and dihydroxyquinoline.

Acylamino preferably stands very generally for $C_1$–$C_4$-alkylcarbonylamino, optionally substituted phenylcarbonylamino, alkyl preferably for optionally substituted $C_1$–$C_4$-alkyl, alkoxy preferably for optionally substituted $C_1$–$C_4$-alkoxy and aryl preferably for optionally substituted phenyl.

The new dyestuffs of the formula I find utility:

as pigments when p, n, m, l=0 and K=1 and A, B and C have no water-solubilizing groups, as wool, nylon and leather dyestuffs when n, m, l=0, K=1 and p=1–3, in the form of their alkali metal salts, as pigments when n, m, l=0, K=1 and p=1–3, in the form of their alkaline earth metal salts, as solvent dyestuffs when n, m, l=0, K=1 and p=1–3, in the form of their amine salts, as reactive dyestuffs for wool, nylon and cotton when l, m, p=0, K=1, n=1 or 2, wherein $Y=CH_2—CH_2—Z$ and $Z=—O—SO_3H$, $—S—SO_3H$, $—O—PO_3H_2$ as direct dyestuffs when m, n=0, l=1, K=2 and p=2–4, as reactive dyestuffs for cotton when K, m=1, l=0 or 1, p=0 to 3 and/or n=0 or 1.

The resulting dyeings, in particular those on cotton or viscose, are distinguished by good fastness properties, in particular very good wet, light and chlorine fastness.

EXAMPLE 1

20.3 g of 3-amino-4-methoxybenzenesulphonic acid are dissolved in about 100 ml of water under neutral conditions, which is followed by cooling with ice, addition of 30 ml of 30% strength hydrochloric acid with stirring and diazotization with 70 ml of 10% strength nitrite solution. Excess nitrite is destroyed after 15 minutes with a little amidosulphonic acid. 15.3 g of 3,4-dimethoxyaniline are sprinkled as solid into the diazotization. The pH value is then raised with 20% strength sodium carbonate solution to pH ≦4 in the course of a period of several hours. The coupling is rapidly complete, and the precipitated dyestuff is filtered off with suction. This gives about 80 g of a paste of an ortho-aminoazo dyestuff which in the form of the free acid conforms to the following formula

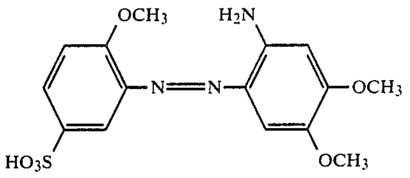

$\lambda_{max}$ = 340
= 480

EXAMPLE 2

About 80 g of the paste of the ortho-amino dyestuff described in Example 1 are dissolved in about 150 ml of water under weakly alkaline conditions, 70 ml of a 10% nitrite solution are added, which is followed by dropwise addition with stirring to a mixture of 30 ml of 30% strength hydrochloric acid and about 70 g of ice. Excess nitrite is destroyed after about 30 minutes with a little amidosulphonic acid. 13 g of barbituric acid are dissolved in about 500 ml of water under neutral conditions and added dropwise to the diazotization mixture. The pH value is then maintained with 20% strength sodium carbonate solution between 6 and 7.

The coupling is rapidly complete. The resultant dyestuff conforms in the form of the free acid to the following formula

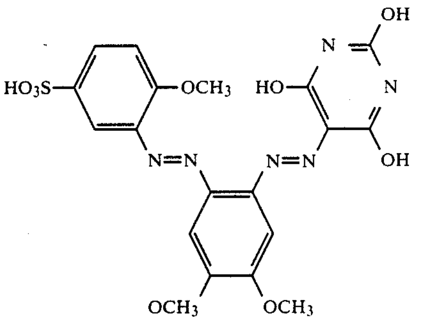

max = 378
max = 428
max = 486

EXAMPLE 3

If instead of 3-amino-4-methoxybenzenesulphonic acid of Example 1 the equivalent amount of 3-amino-4-chlorobenzenesulphonic acid is used and the directions of Examples 1 and 2 are followed, this gives a dyestuff which in the form of the free acid conforms to the following formula:

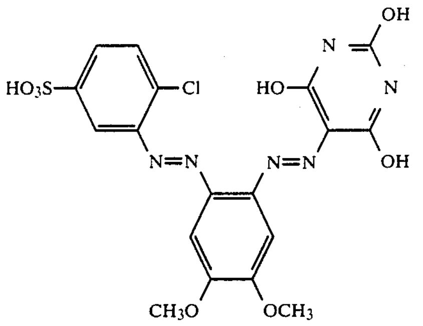

EXAMPLE 4

If in Example 1 the 3-amino-4-methoxybenzenesulphonic acid is replaced by the equivalent amount of 3-amino-4-hydroxybenzenesulphonic acid and the directions of Examples 1 and 2 are followed, this gives a less stable dyestuff which in the form of the free acid conforms to the following formula:

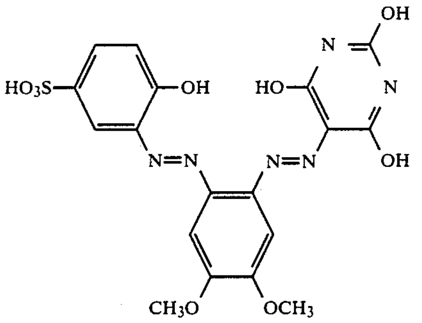

EXAMPLE 5

The ortho-disazo dyestuff reaction mixture described in Example 2 or in Example 3 has added to it 25 g of $CuSO_4 \times 5H_2O$ and a complexing agent such as for example ammonia solution and is stirred at 95° C. for 1–2 hours. The dyestuff is then precipitated with salt and filtered off with suction at room temperature. This gives about 200 g of a paste of an ortho-disazo copper complex which in the form of the free acid conforms to the following formula:

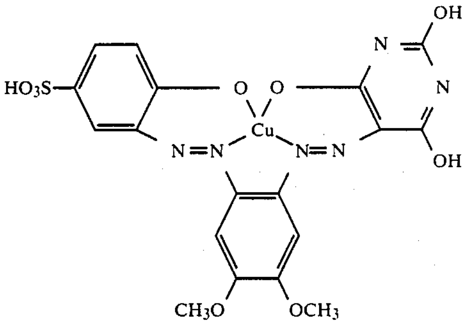

$\lambda_{max}$ = 374
$\lambda_{max}$ = 424
$\lambda_{max}$ = 532

A dyestuff of the same constitution is obtained in admittedly lower yield by treating the dyeStuff described in Example 4 in water with copper-donating agents and neutralizing the resulting acid.

The dyestuff produces on wool and nylon fibre materials reddish brown prints and dyeings of very good wet and light fastness.

Table I below describes further dyestuffs which are obtained by diazotizing the component A—$NH_2$ and coupling on to B—$NH_2$ in ortho-position, diazotizing again and coupling on to C—OH, in accordance with Examples 1–3. The metallization is effected in accordance with Example 5. The new dyestuffs produce the stated hue on the stated substrates.

The absorption spectra feature in some instances more than one band. For that reason more than one $\lambda_{max}$ value is frequently stated.

TABLE I
| Example No. | A—NH₂ | B—NH₂ | C—OH | Me | Hue | Substrate | $\lambda_{max}$ |
|---|---|---|---|---|---|---|---|
| 6 | 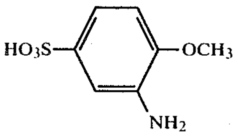 | 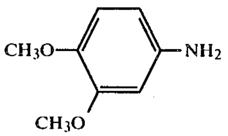 | 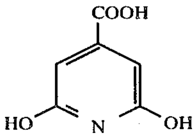 | Cu | blackish brown | wool + nylon | 385, 440, 554 |
| 7 | 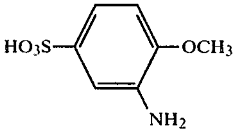 | 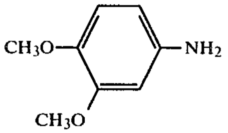 | 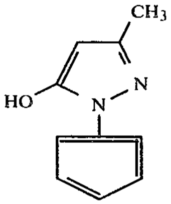 | Cu | dark brown | wool + nylon | 368, 430 |
| 8 | 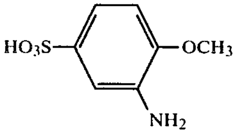 | 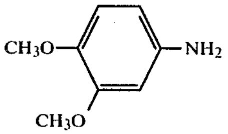 | 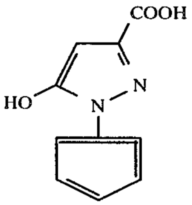 | Cu | dark brown | wool + nylon | 370, 436, 534 |
| 9 | 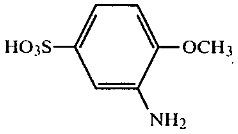 | 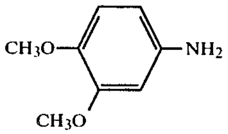 | 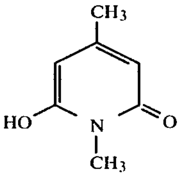 | Cu | dark brown | wool + nylon | 380, 440, 550 |
| 10 | 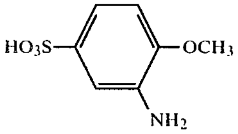 | 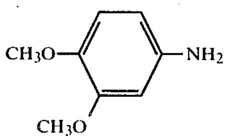 | 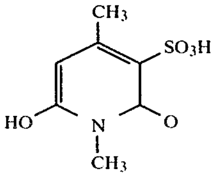 | Cu | dark brown | wool + nylon | 385, 440 555 |

TABLE I-continued
| Example No. | A—NH2 | B—NH2 | C—OH | Me | Hue | Substrate | $\lambda_{max}$ |
|---|---|---|---|---|---|---|---|
| 11 | 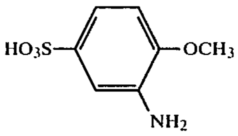 | 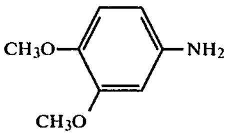 | 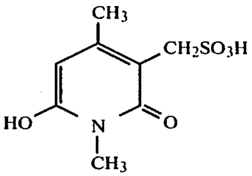 | Cu | dark brown | wool + nylon | 383, 440 552 |
| 12 | 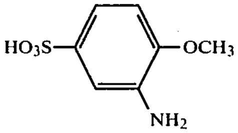 | 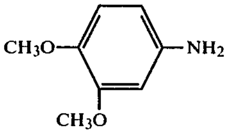 | 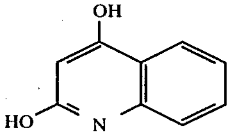 | Cu | brownish green | wool + nylon | |
| 13 | 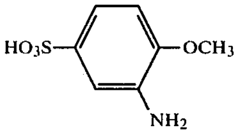 | 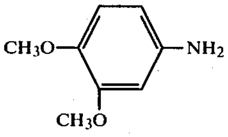 | 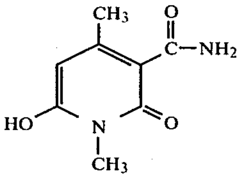 | Cu | dark brown | wool + nylon | 385, 440 554 |
| 14 | 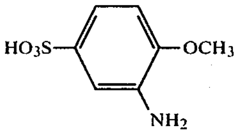 | 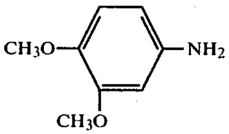 | 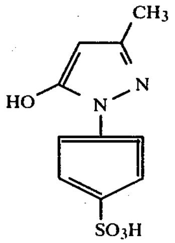 | Cu | dark brown | wool, nylon + leather | 368, 430 |
| 15 | 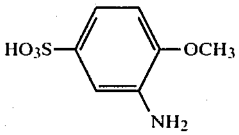 | 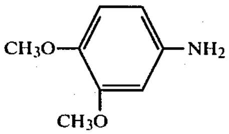 | 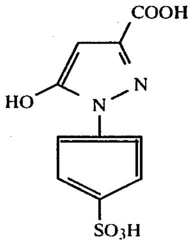 | Cu | dark brown | wool, nylon + leather | 370, 436, 535 |

TABLE I-continued
| Example No. | A—NH2 | B—NH2 | C—OH | Me | Hue | Substrate | $\lambda_{max}$ |
|---|---|---|---|---|---|---|---|
| 16 | 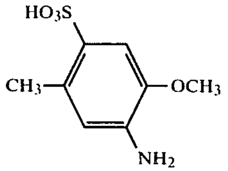 | 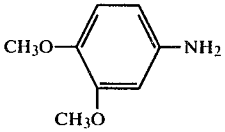 | 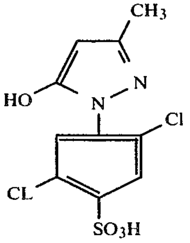 | Cu | dark brown | wool, nylon + leather | |
| 17 | 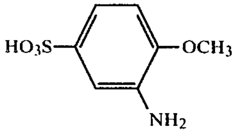 | 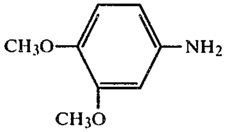 | 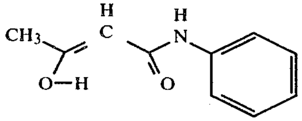 | Cu | brown | wool + nylon | 300, 380 |
| 18 | 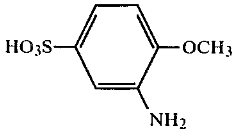 | 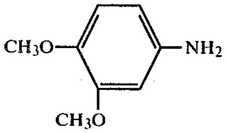 | 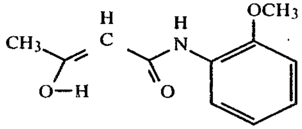 | Cu | brown | wool + nylon | 302, 370, 406 |
| 19 | 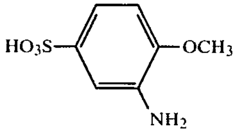 | 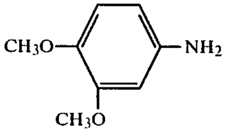 | 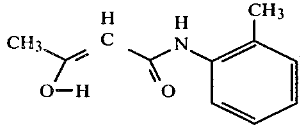 | Cu | brown | wool + nylon | 301, 365, 400 |
| 20 | 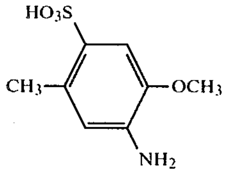 | 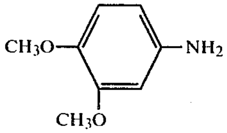 | 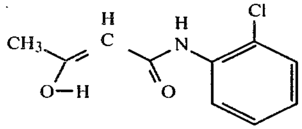 | Cu | brown | wool + nylon | 300, 365, 400 |

TABLE I-continued
| Example No. | A—NH₂ | B—NH₂ | C—OH | Me | Hue | Substrate | $\lambda_{max}$ |
|---|---|---|---|---|---|---|---|
| 21 | 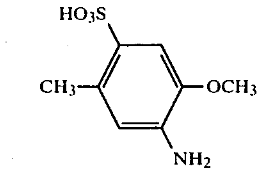 | 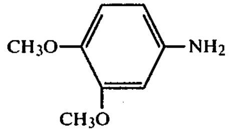 | 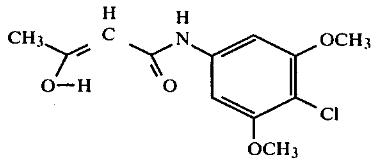 | Cu | brown | wool + nylon | 305, 373, 410 |
| 22 | 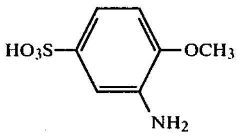 | 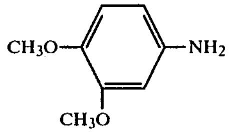 | 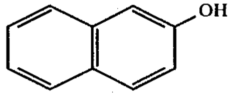 | Cu | olive | wool + nylon | 312, 462 |
| 23 | 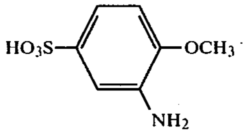 | 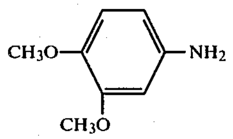 | 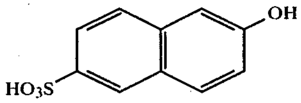 | Cu | olive | wool, nylon + leather | 490 |
| 24 | 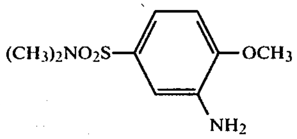 | 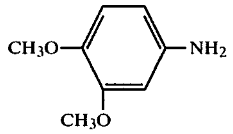 | 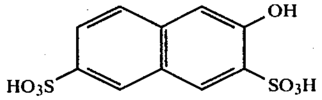 | Cu | olive | wool, nylon + leather | 495 |
| 25 | 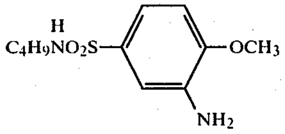 | 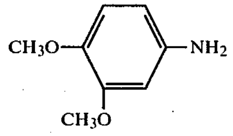 | 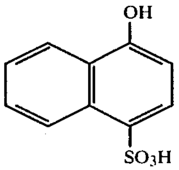 | Cu | olive | wool, nylon + leather | 320, 465 |
| 26 | 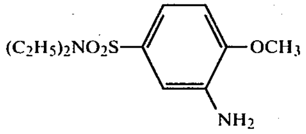 | 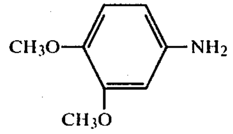 | 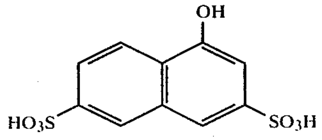 | Cu | olive | wool, nylon + leather | 320, 468 |

TABLE I-continued
| Example No. | A—NH₂ | B—NH₂ | C—OH | Me | Hue | Substrate | $\lambda_{max}$ |
|---|---|---|---|---|---|---|---|
| 27 | 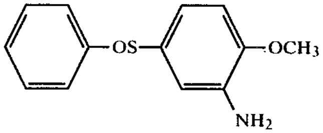 | 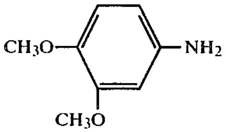 | 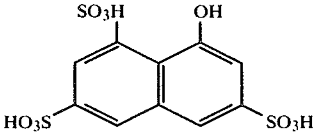 | Cu | olive | wool, nylon + leather | 322, 468 |
| 28 | 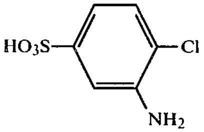 | 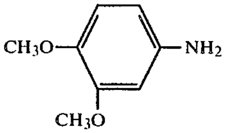 | 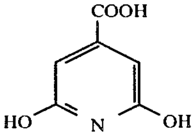 | Cu | blackish brown | wool + nylon | 385, 440, 554 |
| 29 | 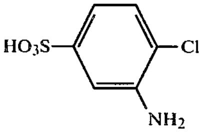 | 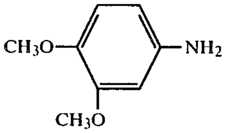 | 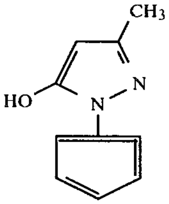 | Cu | dark brown | wool + nylon | 368, 430 |
| 30 | 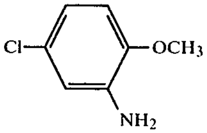 | 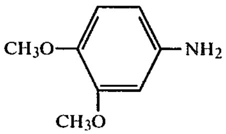 | 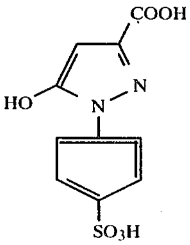 | Cu | dark brown | | 369, 435, 534 |
| 31 | 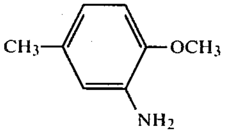 | 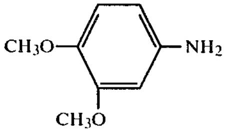 | 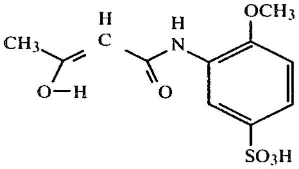 | Cu | brown | wool + nylon | 300, 370, 400 |

TABLE I-continued
| Example No. | $A-NH_2$ | $B-NH_2$ | $C-OH$ | Me | Hue | Substrate | $\lambda_{max}$ |
|---|---|---|---|---|---|---|---|
| 32 | 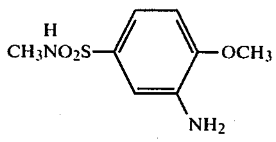 | 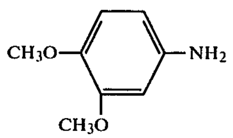 | 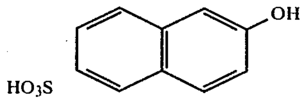 | Cu | olive | wool + nylon | 490 |
| 33 | 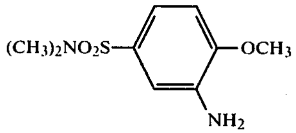 | 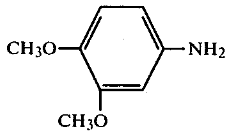 | 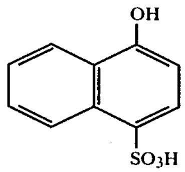 | Cu | olive | wool, nylon + leather | 320, 465 |
| 34 | 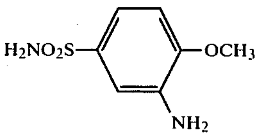 | 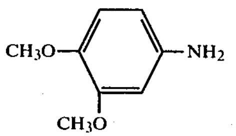 | 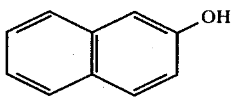 | Cu | olive | wool + nylon | 310, 460 |
| 35 | 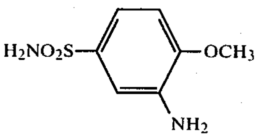 | 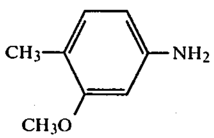 | 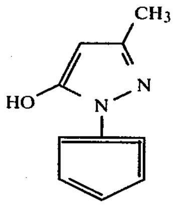 | Cu | brown | wool + nylon | 366, 430 |
| 36 | 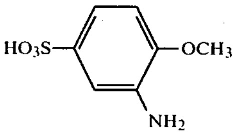 | 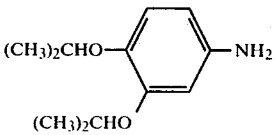 | 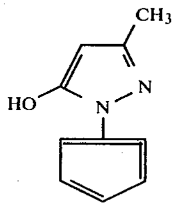 | Cu | dark brown | wool + nylon | 369, 433 |

TABLE I-continued
| Example No. | A—NH2 | B—NH2 | C—OH | Me | Hue | Substrate | $\lambda_{max}$ |
|---|---|---|---|---|---|---|---|
| 37 | 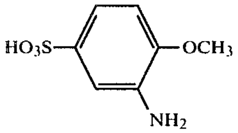 | 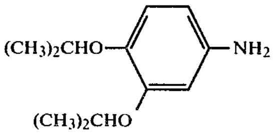 | 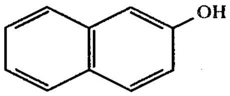 | Cu | olive | wool + nylon | 313, 465 |
| 38 | 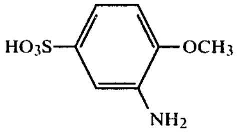 | 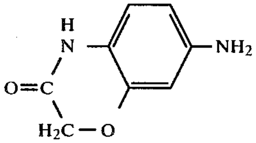 | 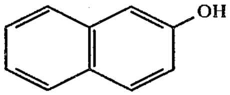 | Cu | olive | wool + nylon | |
| 39 | 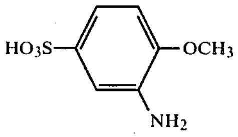 | 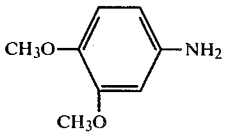 | 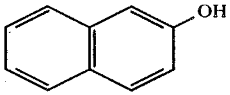 | Cu | olive | wool + nylon | |

EXAMPLE 40

About 80 g of paste of the ortho-aminoazo dyestuff described in Example 1 are dissolved in about 150 ml of water under weakly alkaline conditions, which is followed by addition of 70 ml of 10% nitrite solution and dropwise addition with stirring to a mixture of 30 ml of 30% strength hydrochloric acid and about 70 g of ice. Excess nitrite is destroyed after about 30 minutes with a little amidosulphonic acid.

24 g of 6-amino-1-hydroxynaphthalene-3-sulphonic acid (J acid) are dissolved in 200 ml of water with sodium hydroxide solution under neutral conditions, which is followed by cooling and addition of 150 ml of 20% strength sodium carbonate solution. The diazotization mixture described above is then gradually added. The coupling is rapidly complete. The result obtained is a dyestuff in water which in the form of the free acid conforms to the following formula:

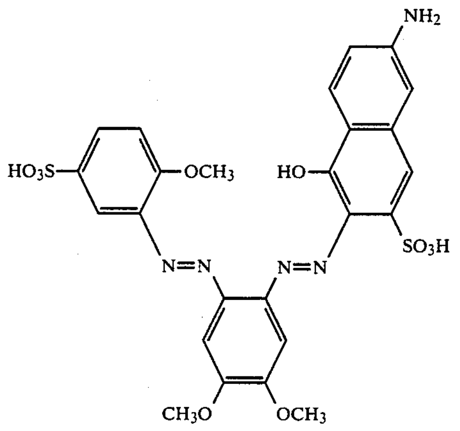

EXAMPLE 41

The reaction mixture described in Example 40 has added to it an ammoniacal copper sulphate solution which contains 25 g of $CuSO_4 \times 5H_2O$, which is followed by stirring at 95° C. for 1-2 hours. The dyestuff is then precipitated with salt and filtered off with suction at room temperature. The result obtained is a dyestuff which in the form of the free acid conforms to the following formula

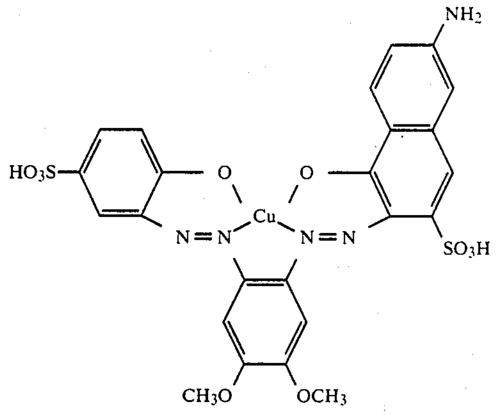

EXAMPLE 42

The whole paste of the dyestuff described in Example 41 is dissolved in about 1 liter of water, which is followed by addition of 18 g of 2,4,6-trifluoro-5-chloropyrimidine and condensation at 25°-35° C. for several hours. The hydrofluoric acid which is liberated is neutralized with hydroxides, carbonates or hydrogencarbonates of the alkali metals. The resulting reactive dyestuff is precipitated with sodium chloride, is filtered off with suction and is dried. This leaves a black powder of a dyestuff which in the form of the free acid conforms to the following formula:

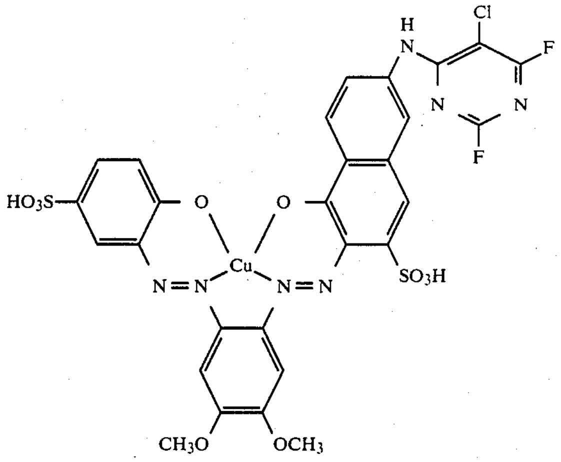

max = 302
max = 468
max = 588

The dyestuff gives an olive-brown solution in water and produces olive dyes and prints on cellulose materials.

Table II below describes further reactive dyestuffs which are obtained by diazotizing the component $A—NH_2$ and coupling on to $B—NH_2$, diazotizing again and coupling on to a partially amino-containing component C—OH, metallizing and where appropriate condensing with a compound X-halogen. The new dyestuffs produce very light-fast and chlorine-fast dyeings and prints on cellulose materials in the stated shades.

TABLE II
| Example No. | A-NH2 | B-NH2 | C-OH | Me | X-Halogen | Hue | $\lambda_{max}$ |
|---|---|---|---|---|---|---|---|
| 43 | 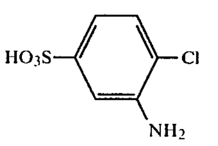 | 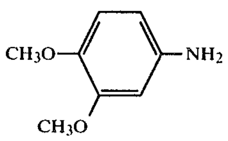 | 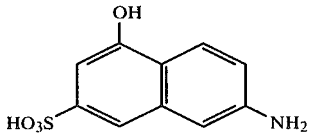 | Cu | 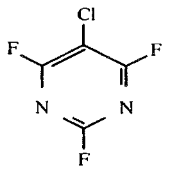 | olive | 302, 468, 588 |
| 44 | 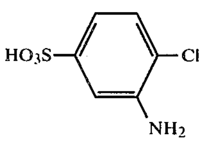 | 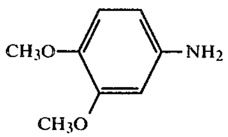 | 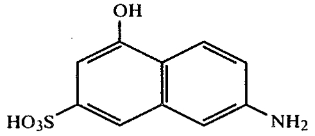 | Cu | 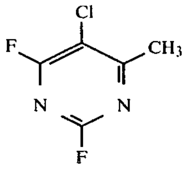 | olive | 302, 468, 588 |
| 45 | 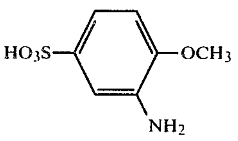 | 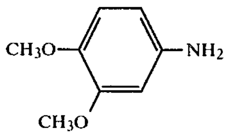 | 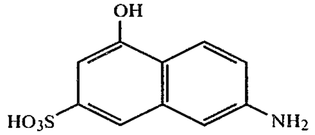 | Cu | 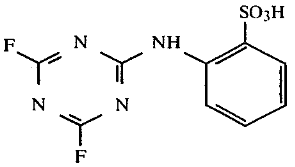 | olive | 302, 468, 588 |
| 46 | 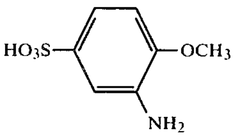 | 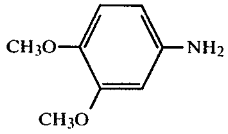 | 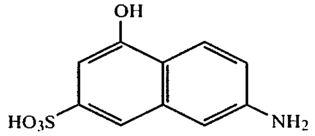 | Cu | 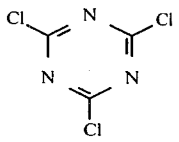 | olive | 302, 468, 588 |
| 47 | 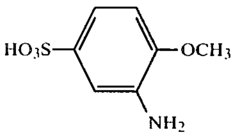 | 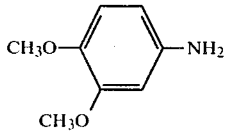 | 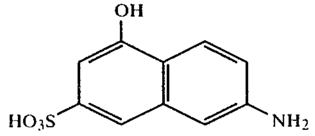 | Cu | 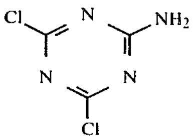 | olive | 302, 468, 588 |

TABLE II-continued
| | | | | | | | |
|---|---|---|---|---|---|---|---|
| 48 | 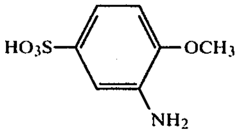 | 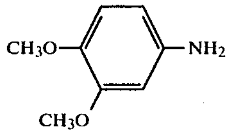 | 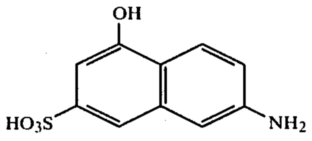 | Cu | 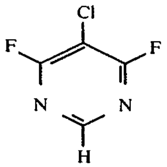 | olive | 302, 468, 588 |
| 49 | 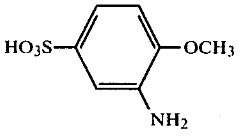 | 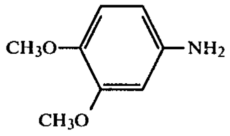 | 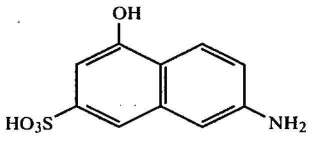 | Cu | 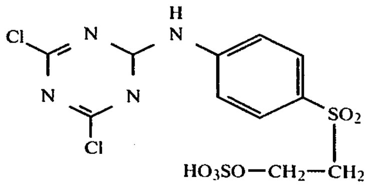 | olive | 302, 468, 588 |
| 50 | 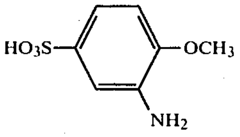 | 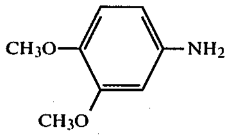 | 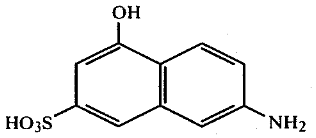 | Cu | 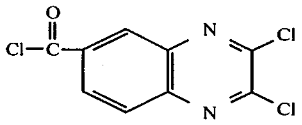 | olive | 302, 468, 588 |
| 51 | 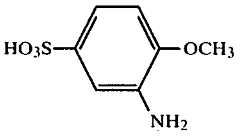 | 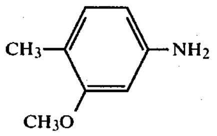 | 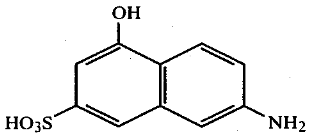 | Cu | 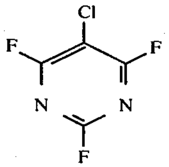 | olive | |
| 52 | 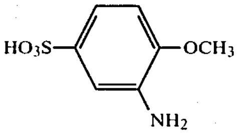 | 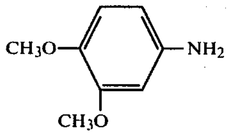 | 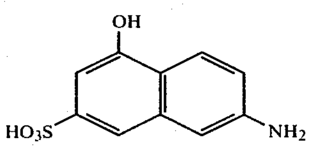 | Ni | 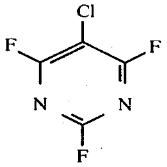 | olive | |
| 53 | 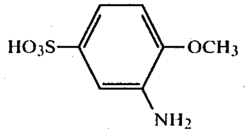 | 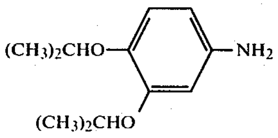 | 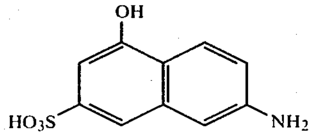 | Cu | 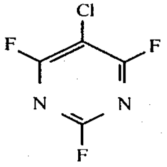 | olive | 302, 470, 586 |

TABLE II-continued
| | | | | | | | |
|---|---|---|---|---|---|---|---|
| 54 | 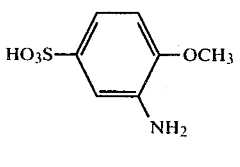 | 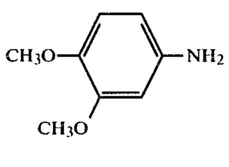 | 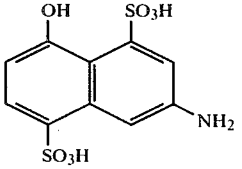 | Cu | 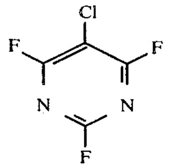 | olive | 314, 468, 582 |
| 55 | 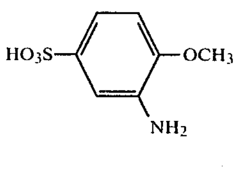 | 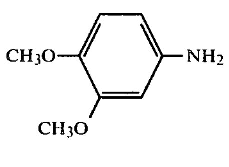 | 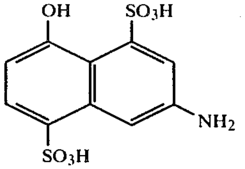 | Cu | 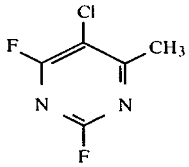 | olive | 314, 468, 582 |
| 56 | 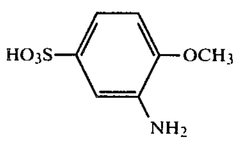 | 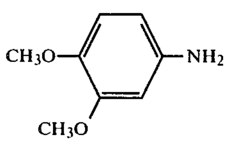 | 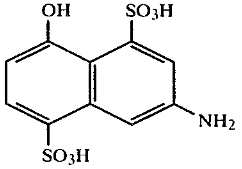 | Cu | 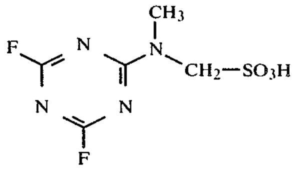 | olive | 314, 468, 582 |
| 57 | 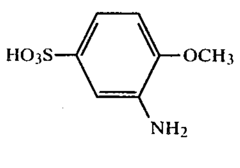 | 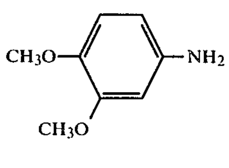 | 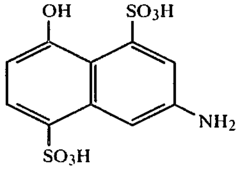 | Cu | 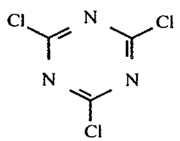 | olive | 314, 468, 582 |
| 58 | 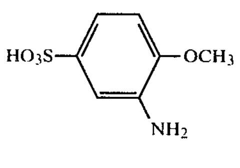 | 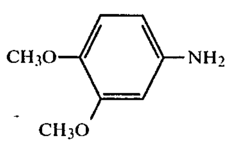 | 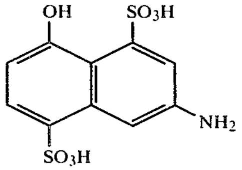 | Cu | 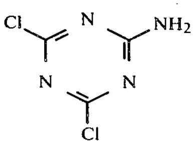 | olive | 314, 468, 582 |
| 59 | 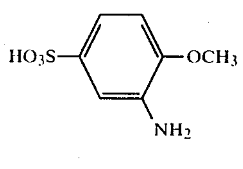 | 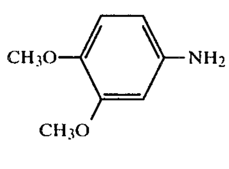 | 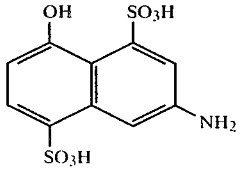 | Cu | 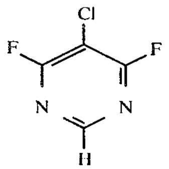 | olive | 314, 468, 582 |

TABLE II-continued
| Example No. | A-NH2* | B-NH2 | C-OH | Me | X-Halogen | Hue | $\lambda_{max}$ |
|---|---|---|---|---|---|---|---|
| 60 | 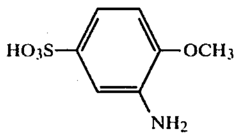 | 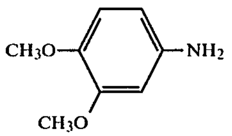 | 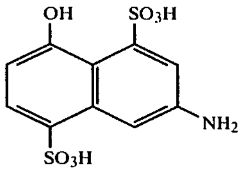 | Cu | 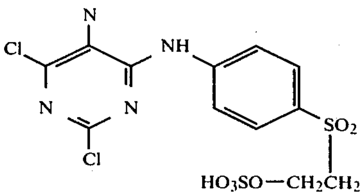 | olive | 314, 468, 582 |
| 61 | 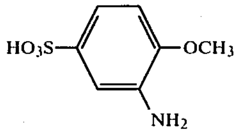 | 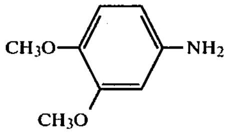 | 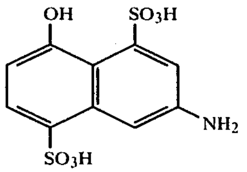 | Cu | 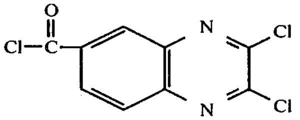 | olive | 314, 468, 582 |
| 62 | 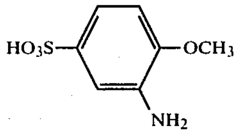 | 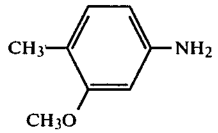 | 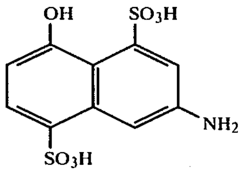 | Cu | 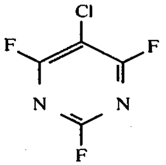 | olive | |
| 63 | 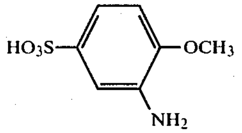 | 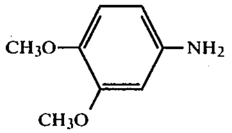 | 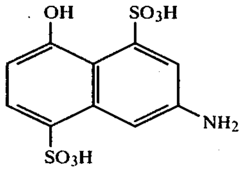 | Ni | 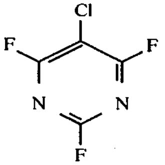 | olive | |
| 64 | 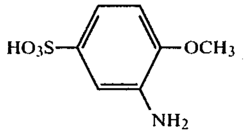 | 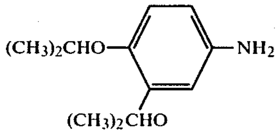 | 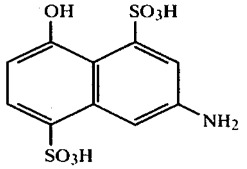 | Cu | 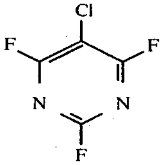 | olive | 316, 470, 580 |

TABLE II-continued
| | | | | | | | |
|---|---|---|---|---|---|---|---|
| 65 | 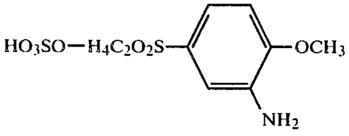 | 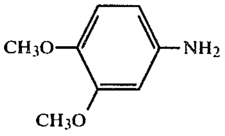 | 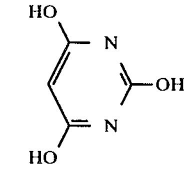 | Cu | — | reddish brown | 375, 425, 532 |
| 66 | 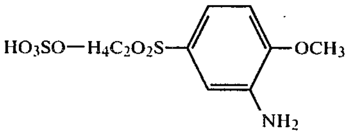 | 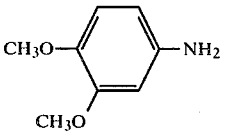 | 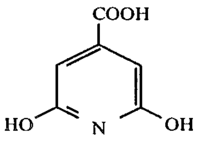 | Cu | — | black-ish brown | 386, 440, 554 |
| 67 | 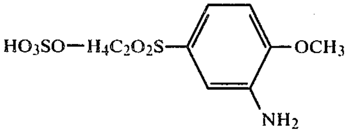 | 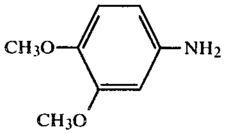 | 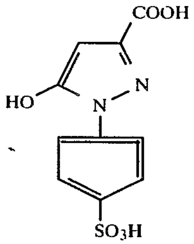 | Cu | — | dark brown | 370, 437, 535 |
| 68 | 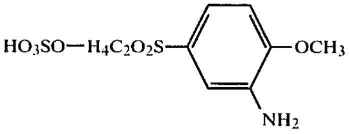 | 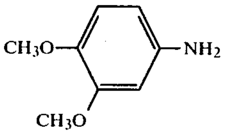 | 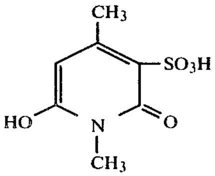 | Cu | — | dark brown | 385, 440, 555 |
| 69 | 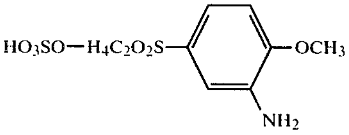 | 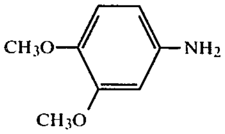 | 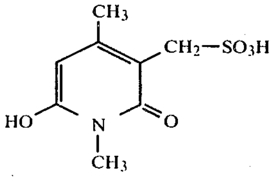 | Cu | — | dark brown | 383, 440, 552 |

TABLE II-continued
| | | | | | | | |
|---|---|---|---|---|---|---|---|
| 70 | 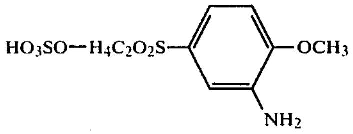 | 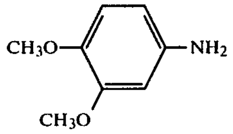 | 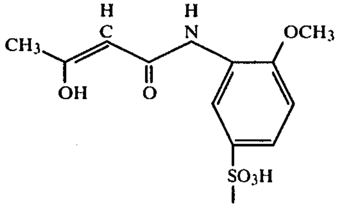 | Cu | — | brown | 303, 372, 406 |
| 71 | 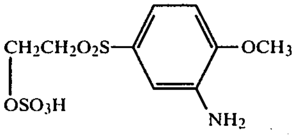 | 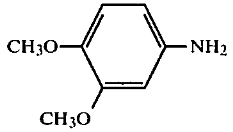 | 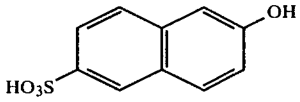 | Cu | — | olive | 491 |
| 72 | 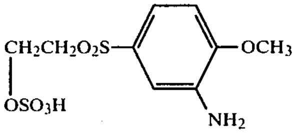 | 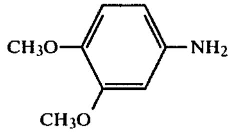 | 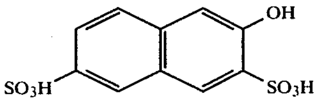 | Cu | — | olive | 496 |
| 73 | 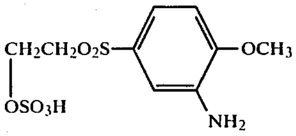 | 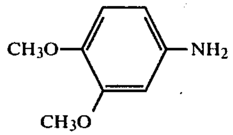 | 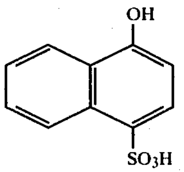 | Cu | — | olive | 322, 465 |
| 74 | 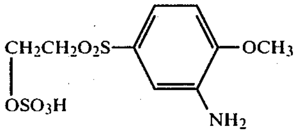 | 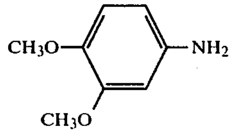 | 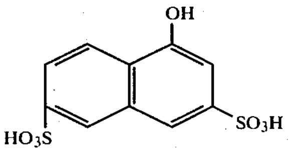 | Cu | — | olive | 322, 468 |
| 75 | 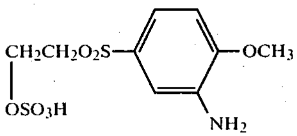 | 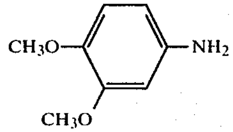 | 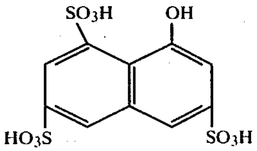 | Cu | — | olive | 324, 468 |
Ex- TABLE II-continued
| Example No. | $A-NH_2$* | $B-NH_2$ | C-OH* | Me | X-Halogen | Hue | $\lambda_{max}$ |
|---|---|---|---|---|---|---|---|
| 76 | 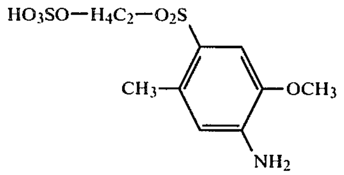 | 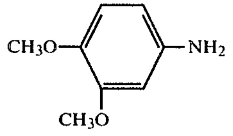 | 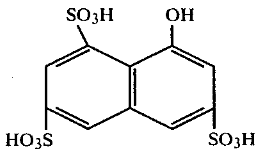 | Cu | — | olive | |
| 77 | 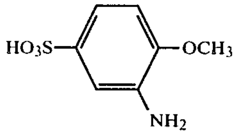 | 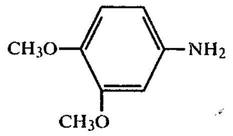 | 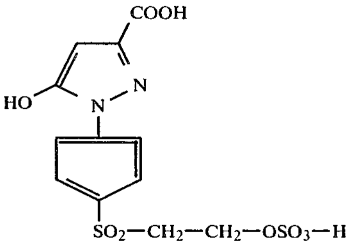 | Cu | — | dark brown | 370, 436, 535 |
| 78 | 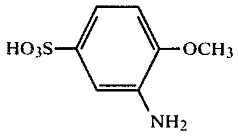 | 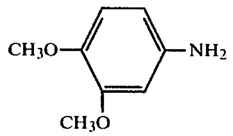 | 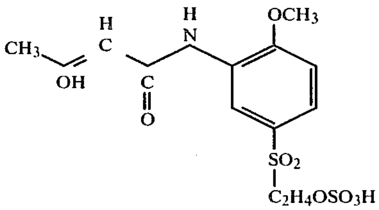 | Cu | — | brown | |
| 79 | 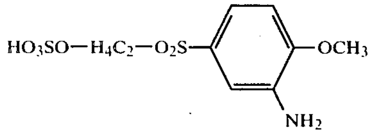 | 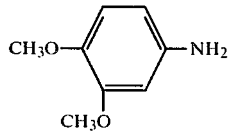 | 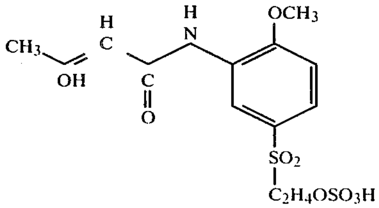 | Cu | — | brown | |

TABLE II-continued
| | | | | | | | |
|---|---|---|---|---|---|---|---|
| 80 | 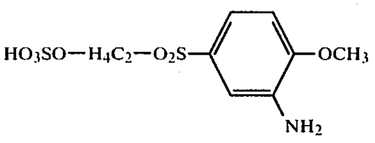 | 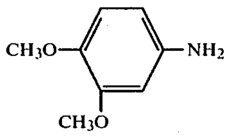 | 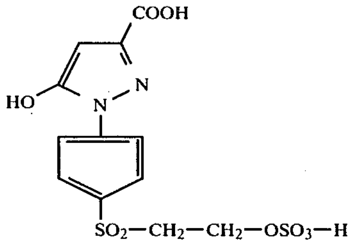 | Cu | — | dark brown | 371, 436, 535 |
| 81 | 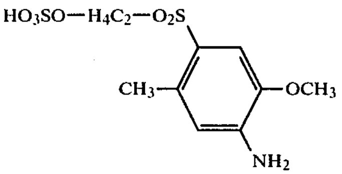 | | 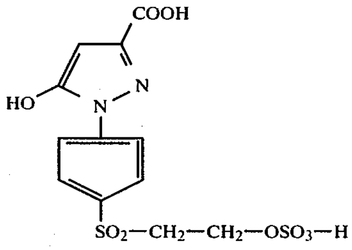 | Cu | — | dark brown | |
| 82 | 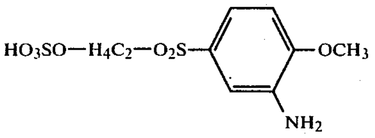 | | 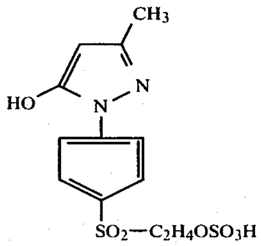 | Cu | — | dark brown | 369, 430 |
| 83 | 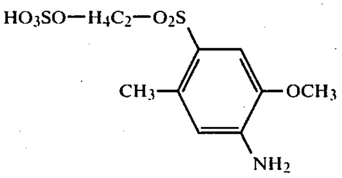 | | 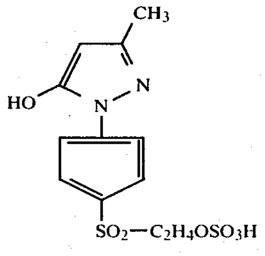 | Cu | — | dark brown | |

TABLE II-continued
| | | | | | | | |
|---|---|---|---|---|---|---|---|
| 84 | 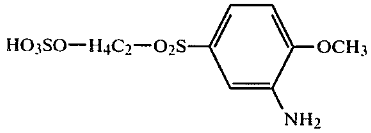 | 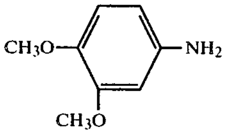 | 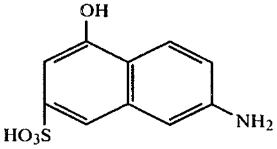 | Cu | 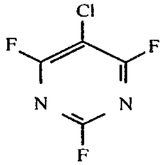 | olive | 303, 468, 588 |
| 85 | 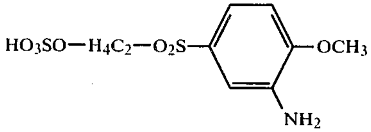 | 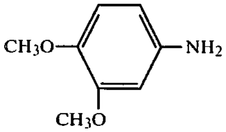 | 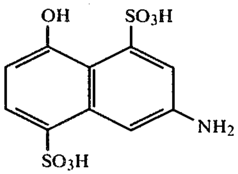 | Cu | 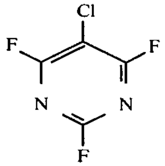 | olive | 315, 468, 582 |
| 86 | 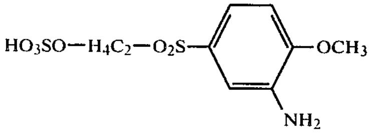 | 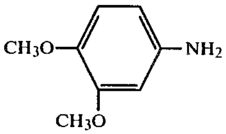 | 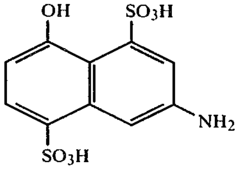 | Cu | 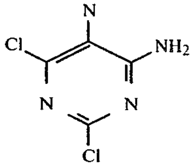 | olive | 315, 468, 582 |
| 87 | 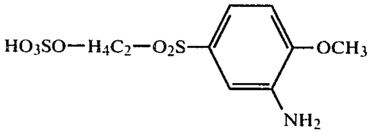 | 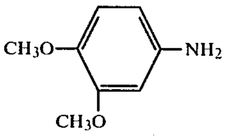 | 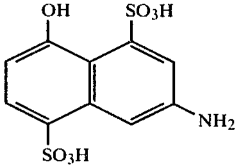 | Cu | 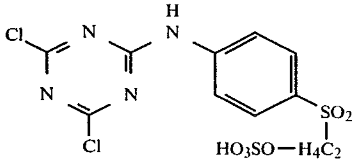 | olive | 315, 468, 582 |
| 88 | 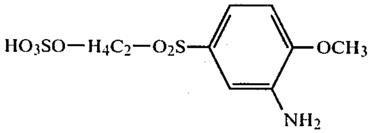 | 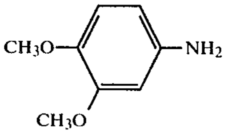 | 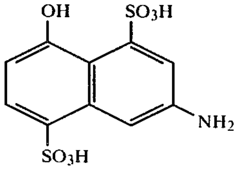 | Cu | 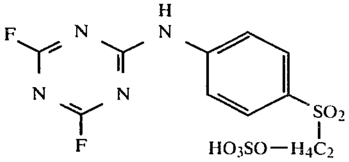 | olive | 315, 468, 582 |
| 89 | 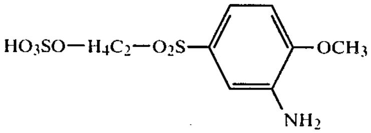 | | 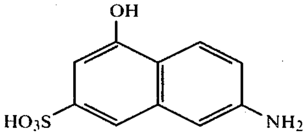 | Cu | 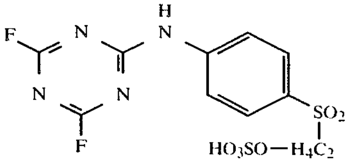 | olive | 303, 468, 588 |

TABLE II-continued
| Example No. | A-NH2 | B-NH2 | C-OH | Me | X-Halogen | Hue | $\lambda_{max}$ |
|---|---|---|---|---|---|---|---|
| 90 | 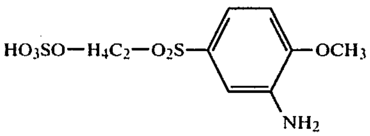 | 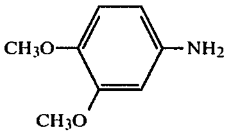 | 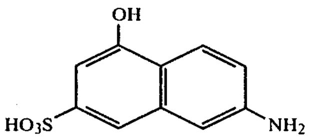 | Cu | 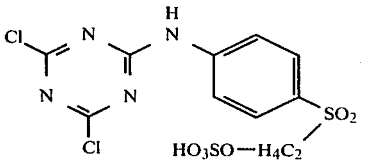 | olive | 303, 468, 588 |
| 91 | 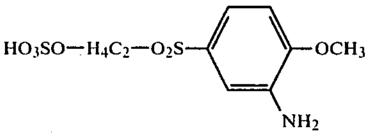 | 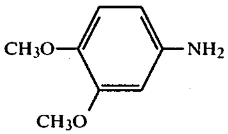 | 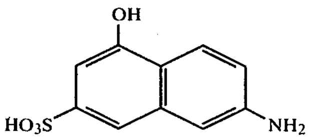 | Ni | 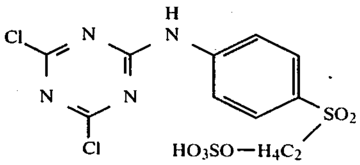 | olive | |
| 92 | 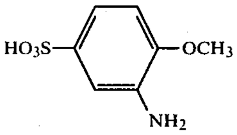 | 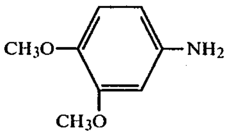 | 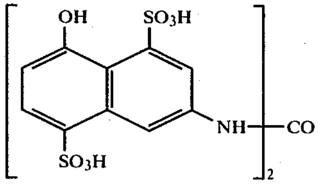 | Cu | — | olive | 314, 470, 582 |
| 93 | 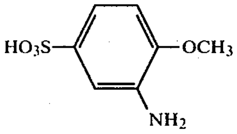 | 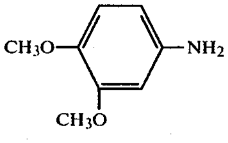 | 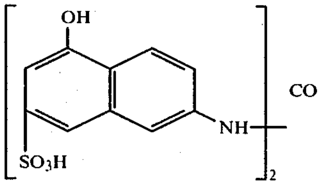 | Cu | — | olive | 302, 470, 588 |
| 94 | 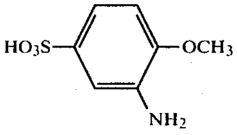 | 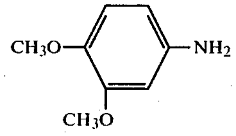 | 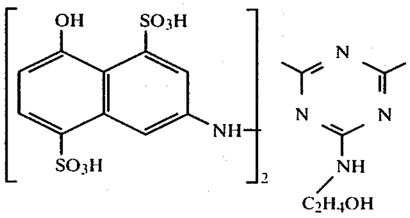 | Cu | — | olive | 314, 470, 582 |

TABLE II-continued
| | | | | | | | |
|---|---|---|---|---|---|---|---|
| 95 | 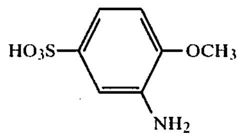 | 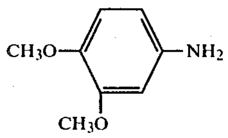 | 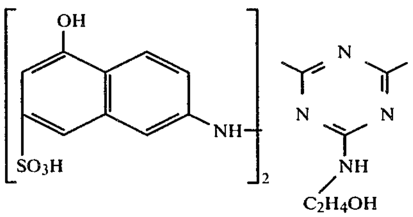 | Cu | — | olive | 302, 470, 588 |
*Sulphation is effected after the metallization in accordance with German Auslegeschrift 1,443,877

I claim:

1. A dyestuff which in the form of the free acid has the formula

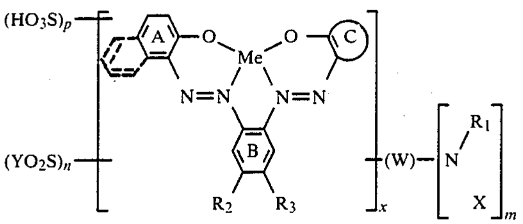

wherein

A is unsubstituted or substituted by halogen, nitro, alkyl, alkoxy, carboxy, sulfo, -hydroxyethylsulfonyl or $C_1$-$C_4$-alkylcarbonylamino;

$R_2$=$C_1$-$C_4$-alkyl, chlorine, $C_1$-$C_4$-alkoxy, $C_1$-$C_4$-alkyl-carbonylamino, arylcarbonylamino, aralkylcarbonylamino;

$R_3$=$C_1$-$C_4$-alkoxy, or $R_2$ and $R_3$ form a ring and have the meaning below

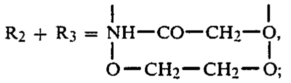

C=the radical of a hydroxybenzene, hydroxynaphthalene, pyrazolone, pyridone, pyrimidone, quinolone or acetoacetarylide enolic coupling component;

W=direct bond to a carbon atom of the benzene or naphthalene nuclei in A or B or to a carbon atom of an aromatic or aromatically heterocyclic ring C;

$R_1$=H, $C_1$-$C_4$-alkyl;

X=H

Y-vinyl, $\beta$-halogenovinyl or —$CH_2CH_2Z$ wherein

Z=$OSO_3H$, $SSO_3H$, $OPO_3H_2$, $OCOCH_3$, or dialkylamino;

K=1 or 2;

p=0 to 4;

m=0, 1, 2 or 3; and n=0 and Me=a divalent metal atom.

2. A dyestuff according to claim 1, wherein m, n, p=0 k=1, which are free of water-solubilizing groups.

3. A dyestuff according to claim 1, wherein m, n=0 k=1 p=1-3.

4. A dyestuff according to claim 1, wherein m, n=0 k=2 and p=2 to 4.

5. A dyestuff which in the form of the free acid has the formula

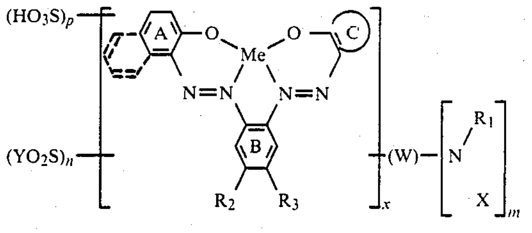

wherein

A is unsubstituted or substituted by halogen, nitro, alkyl, alkoxy, carboxy, sulfo, -hydroxyethylsulfonyl or $C_1$-$C_4$-alkylcarbonylamino;

$R_2$=$C_1$-$C_4$-alkyl, chlorine, $C_1$-$C_4$-alkoxy, $C_1$-$C_4$-alkyl-carbonylamino, arylcarbonylamino, aralkylcarbonylamino;

$R_3$=$C_1$-$C_4$-alkoxy, or $R_2$ and $R_3$ form a ring and have the meaning below

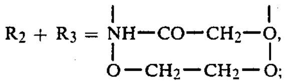

C=the radical of a hydroxybenzene, hydroxynaphthalene, pyrazolone, pyridone, pyrimidone, quinolone or acetoacetarylide enolic coupling component;

W=direct bond to a carbon atom of the benzene or naphthalene nuclei in A or B or to a carbon atom of an aromatic or aromatically heterocyclic ring C;

$R_1$=H; $C_1$-$C_4$-alkyl;

X=fiber reactive mono- or di-halogeno-symmetric triazinyl, mono-, di- or trihalogeno pyrimidinyl, 2,3-di-chloroquinoxyline-6-carbonyl or 2,3-dichloroquinoxyline-6-sulfonyl;

Y=vinyl, $\beta$-halogenovinyl or —$CH_2$—$CH_2Z$ wherein

Z=$OSO_3H$, $SSO_3H$, $OPO_3H_2$, $OCOCH_3$, dialkylamino;

K=1 or 2;

p=0 to 4;

m=0, 1, 2 or 3; and n=0, 1, 2, 3 or 4 provided that m and n cannot be 0 at the same time and Me=a divalent metal atom.

6. A dyestuff according to claim 2, wherein m, p=0 k=1 n=1 or 2, wherein y=$CH_2$—$CH_2Z$

Z=—O —$SO_3H$, —S—$SO_3H$, —O—$PO_3H_2$.

7. A reactive dyestuff of the formula

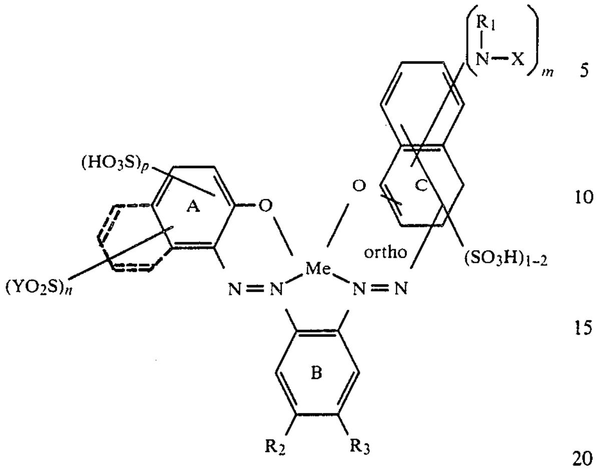

wherein

A is unsubstituted or substituted by halogen, nitro, alkyl, alkoxy, carboxy, sulfo, -hydroxyethylsulfonyl or $C_1$-$C_4$-alkylcarbonylamino;

$R_2$=$C_1$-$C_4$-alkyl, chlorine, $C_1$-$C_4$-alkoxy, $C_1$-$C_4$-alkyl-carbonylamino, arylcarbonylamino, aralkylcarbonylamino; $R_3$=$C_1$-$C_4$-alkoxy, or $R_2$ and $R_3$ form a ring and have the meaning below

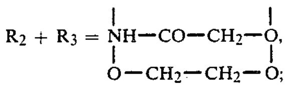

W=direct bond to a carbon atom of the benzene or naphthalene nuclei in A or B or to a carbon atom of an aromatic or aromatically heterocyclic ring C;

$R_1$=H, $C_1$-$C_4$-alkyl;

X=fiber reactive mono- or di-halogeno-symmetric triazinyl, mono-, di- or trihalogeno pyrimidinyl, 2,3-di-chloroquinoxyline-6-carbonyl or 2,3-dichloroquinoxyline-6-sulfonyl;

Y=vinyl, $\beta$-halogenovinyl or $-CH_2CH_2Z$ wherein

Z=$OSO_3H$, $SSO_3H$, $OPO_3H_2$, $OCOCH_3$, or dialkylamino;

p=0 to 4;

m=0, 1, 2 or 3; and n=0, 1, 2, 3 or 4 provided that m and n cannot 0 at the same time and Me=a divalent metal atom.

8. A reactive dyestuff according to claim 7 wherein $R_2$ and $R_3$=$C_1$-$C_4$-alkoxy and $R_1$=H.

9. A reactive dyestuff according to claim 7 of the formula

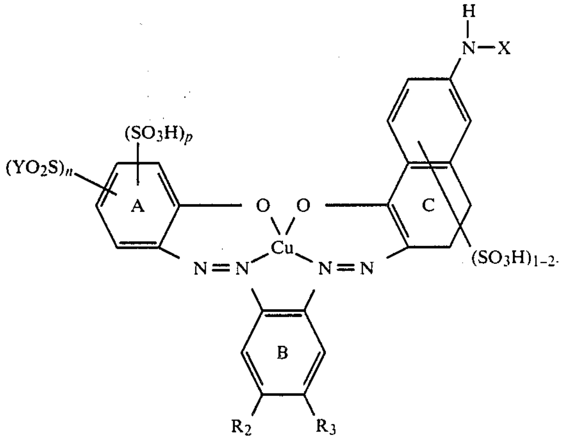

* * * * *

UNITED STATES PATENT AND TRADEMARK OFFICE

CERTIFICATE OF CORRECTION

PATENT NO. : 4,772,687

DATED : September 20, 1988

INVENTOR(S) : Hermann Henk

It is certified that error appears in the above-identified patent and that said Letters Patent is hereby corrected as shown below:

| | |
|---|---|
| Col. 3, line 61 | After "2-(6',8'" insert -- - -- |
| Col. 5, lines 20, 21 | Delete "ypyrimidin-" and substitute --y-pyrimidin- -- |
| Col. 9, line 51 | Delete "ortho-diazo" and substitute --ortho-disazo-- |
| Col. 54, line 41 | Delete "$R,=H;C_1$-" and substitute -- $R,=H,C_1$- -- |
| Col. 54, line 60 | Delete "claim 2" and substitute --claim 5-- |

Col. 5, line 60, "2pyridinium and substitute -- 2-pyridinium --.

Signed and Sealed this

Tenth Day of October, 1989

Attest:

DONALD J. QUIGG

Attesting Officer

Commissioner of Patents and Trademarks